United States Patent
King et al.

(10) Patent No.: US 9,560,838 B1
(45) Date of Patent: Feb. 7, 2017

(54) ARTIFICIAL STRUCTURE FOR ATTRACTING FISH

(71) Applicants: David King, Springdale, AR (US); Ray Stewart, Springdale, AR (US)

(72) Inventors: David King, Springdale, AR (US); Ray Stewart, Springdale, AR (US)

(*) Notice: Subject to any disclaimer, the term of this patent is extended or adjusted under 35 U.S.C. 154(b) by 287 days.

(21) Appl. No.: 14/244,497

(22) Filed: Apr. 3, 2014

Related U.S. Application Data (63) Continuation-in-part of application No. 13/600,639, filed on Aug. 31, 2012, now abandoned, and a continuation-in-part of application No. 13/591,648, filed on Aug. 22, 2012, now abandoned, which is a continuation-in-part of application No. 12/807,230, filed on Aug. 31, 2010, now abandoned.

(60) Provisional application No. 61/337,770, filed on Feb. 10, 2010.

(51) Int. Cl.
    *A01K 61/00* (2006.01)
    *A01K 97/01* (2006.01)

(52) U.S. Cl.
    CPC ............ *A01K 61/006* (2013.01); *A01K 97/01* (2013.01)

(58) Field of Classification Search
    CPC .... A01K 61/00; A01K 61/006; A01K 61/007; A01K 97/00; A01K 97/01
    USPC ................ 119/207, 208, 209, 238, 239, 241
    See application file for complete search history.

(56) References Cited

U.S. PATENT DOCUMENTS

| | | | | |
|---|---|---|---|---|
| 1,516,767 A | * | 11/1924 | Falley | E02B 3/04 405/28 |
| 3,267,679 A | * | 8/1966 | Morse | E02B 3/04 405/35 |
| 4,727,672 A | | 3/1988 | Hill et al. | 43/4 |
| 4,916,845 A | | 4/1990 | Aydelette, Sr. | 43/4 |
| 5,005,309 A | | 4/1991 | Hall | 43/4 |
| 5,272,829 A | | 12/1993 | Roberts et al. | 43/4 |
| 5,315,779 A | | 5/1994 | Fussell | 43/4 |
| 5,961,251 A | * | 10/1999 | Prendergast | E02B 3/043 405/23 |
| 6,523,497 B2 | | 2/2003 | Smith | 119/221 |
| 6,978,735 B1 | | 12/2005 | Yeager | 119/221 |
| 2002/0069832 A1 | * | 6/2002 | Smith | A01K 61/006 119/221 |
| 2002/0185079 A1 | * | 12/2002 | Truebe | A01K 61/00 119/219 |

* cited by examiner

*Primary Examiner* — Monica Williams
*Assistant Examiner* — Magdalena Topolski
(74) *Attorney, Agent, or Firm* — Wright Lindsey & Jennings LLP; Meredith Lowry (57) ABSTRACT

A structure for attracting fish in lakes and ponds is presented that includes a central mast with one or more angled shafts for the fish to rest upon and congregate near.

7 Claims, 13 Drawing Sheets

ARTIFICIAL STRUCTURE FOR ATTRACTING FISH

CROSS-REFERENCE TO RELATED APPLICATIONS

This application claims priority to and is a continuation-in-part of U.S. application Ser. No. 13/600,639, filed Aug. 31, 2012 and claims priority to and is a continuation-in-part of U.S. application Ser. No. 13/591,648, filed Aug. 22, 2012, which claims priority to and is a continuation-in-part of U.S. application Ser. No. 12/807,230, filed Aug. 21, 2010, which claims priority to and is a continuation-in-part of U.S. Application Ser. No. 61/337,770, filed Feb. 10, 2010, which are both hereby incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention pertains to artificial structures adapted for submersion in bodies of water. The artificial structure is configured to be attractive to fish, and thus to create an artificial habitat around which fish can usually be found.

2. Description of the Known Art

Fish that live in natural environments such as lakes, streams, oceans, ponds and rivers, can usually be found around the protective cover of rocks, coral, plant life and the like. However, many of these habitats have been destroyed by natural phenomena such as hurricanes, floods, and the like. Additionally man made problems such as pollutants, dams and other developmental issues have claimed their fair share of these habitats as well. This loss of habitats has led to entire species being lost from certain bodies of waters, thus further affecting other organisms in the food chain. Even fishermen, who at one time would frequent certain fishing spots, would stop their visits, thus affecting local business cycles as well.

Accordingly, there exists a need for a means by which fish habitats can be replaced or created in a manner which is quick, easy and effective. The development of the artificial structure for attracting fish fulfills this need.

Details of artificial structures for attracting fish are contained in U.S. Pat. No. 4,727,672 issued to Hill, et al. on Mar. 1, 1988; U.S. Pat. No. 4,916,845 issued to Aydelette, Sr. on Apr. 17, 1990; U.S. Pat. No. 5,005,309 issued to Hall on Apr. 9, 1991; U.S. Pat. No. 5,272,829 issued to Roberts, et al. on Dec. 28, 1993; U.S. Pat. No. 5,315,779 issued to Fussell on May 31, 1994; U.S. Pat. No. 6,523,497 issued to Smith on Feb. 25, 2003; U.S. Pat. No. 6,978,735 issued to Yeager on Dec. 27, 2005. Each of these patents is hereby expressly incorporated by reference in their entirety.

U.S. Pat. No. 4,727,672 issued to Hill, et al. on Mar. 1, 1988 entitled Artificial Structure for Attracting Fish teaches an artificial structure for attracting fish that includes a ballast and anchoring subassembly having an elongated trunk detachably and pivotally connected thereto and extending in a generally vertical direction therefrom. A plurality of elongated leaf fronds are each centrally engaged with the trunk at longitudinally spaced intervals along the trunk.

U.S. Pat. No. 4,916,845 issued to Aydelette, Sr. on Apr. 17, 1990 entitled Device to Attract Fish discloses a device for attracting fish in fresh water lakes and ponds that includes one or more disk which are tandemly arranged and are anchored by a tubular transparent anchor which contains bait fish. The disk have a concave configuration and are formed from a floatable plastic. A serrated edge on at least the bottom disk provides a niche for a fishing line to maintain the fishing line bait near the fish which congregate under the disks.

U.S. Pat. No. 5,005,309 issued to Hall on Apr. 9, 1991 entitled Instrumented Drift Fish Aggregating Device and Method discloses an instrumented drift fish aggregating device to attract game fish for harvest. A highly positive flotation buoy with instrumentation including visual and radio acquisition devices floats on the water. Suspended from the buoy is a plurality of suspension lines connected to a ballast weight, which combine for stability of the buoy. A multiplicity of fish attraction streamers are connected to the suspension lines. The device can provide information to a remote location, such as a fishing vessel, by radio means as to its location, water temperature and quantity of fish in the vicinity of the buoy.

U.S. Pat. No. 5,272,829 issued to Roberts, et al. on Dec. 28, 1993 entitled Fish Attracting Bassin Stump and Method of Use discloses a fish attracting device which simulates a tree stump to provide a habitat for fish to congregate. The device includes an outer textured wall that resembles the bark on a tree trunk and an inner chamber secured to the outer textured wall. A structure for deploying the device within a body of water is secured to the inner chamber.

U.S. Pat. No. 5,315,779 issued to Fussell on May 31, 1994 entitled Fish Habitat discloses an artificial habitat assembly for fish or other aquatic life that includes a series of vertically spaced plates or discs having a specified gravity less than 1.0, which are held adjacent the bottom of a body of water by an anchor and a flexible stress member to which the plates are attached in vertically spaced relationship. The plates provide areas of shade or darkness which are attractive to fish seeking shelter.

U.S. Pat. No. 6,523,497 issued to Smith on Feb. 25, 2003 entitled Reticulated Fish Aggregation Apparatus discloses a submersible artificial fish bed formed of hollow members that are self flooded in order to be placed.

U.S. Pat. No. 6,978,735 issued to Yeager on Dec. 27, 2005 entitled Artificial Fish Habitat discloses an artificial fish habitat that comprises an open framework including a plurality of layers. The layers each include an open portion and are generally aligned so that the open portions cooperate to define a passageway through the framework for fish to reside therein. Each layer includes a periphery section which is formed from a material presenting a minimum cross section sized and configured to be greater than the gap spacing of a conventional fish hook such that the hook may not snag on the framework. A method of utilizing the partially submerged habitat comprises descending a hook through the passageway to contact a layer and withdrawing the hook without snagging.

The use of the present invention provides fish an artificial habitat in areas where none exist. Fisherman in the past have cut natural tree limbs or shrubs and placed them at desired locations in lakes and ponds to serve as gathering points and shelters for fish. All such past devices have been employed with varying degrees of success depending on the type of fishing conducted, and the particular conditions encountered. Certain serious drawbacks have resulted for example, in using artificial or natural tree limbs as fishing lines often become enwrapped with the limbs and have to be cut free. Other specific devices which have been used are difficult to retrieve or move as may be desired from time to time or from location to location. Also, artificial devices can be expensive, easily damaged and are therefore little used. Other artificial devices have provided an area that attracts fish momentarily, but does not encourage the fish to stay within the area for a length of time since the fish must remain active.

In icy environments, government restrictions prevent fishermen from deploying permanent or semi-permanent structures. Only structures which can fit within the limits of a hole cut in the ice, approximately eight inches or so, can be used. The prior art fails to show a device that can be deployed within the confines of an ice fishing hole and subsequently removed.

The prior art patents are very limited in their teaching and utilization, and an improved artificial structure for attracting fish in an icy environment is needed to overcome these limitations.

SUMMARY OF THE INVENTION

The present invention is an artificial structure for attracting fish within an icy environment. The structure is comprised of central mast with a series of pivoting shafts with deploying mechanisms to pivot the shafts into an extended position once the shafts are submerged in water. The structure is composed of material adapted to be lowered to the bottom of a lake, stream, pond or other similar body of water. The structure forms an artificial habitat or shield for any fish who may be seeking refuge from predators or seeking other fish or food to eat. In one embodiment, the shafts are angled, allowing for fish to rest upon the surface of the shaft. These resting areas provide motivation for the fish to stay within the area for a length of time. Such artificial habitats can also be used to the advantage of fishermen who are looking for the areas where fish tend to congregate. The present invention has proven to provide an attractive area for fish to congregate as fishermen have hooked numerous fish hours after the invention has been deployed.

An objective of the present invention is to provide a device which will present fish in icy ponds and lakes with an attractive gathering site and also will be convenient for the fishermen to exploit.

Another objective to the present invention is to provide a device to attract fish which includes an angular shaft which provides a resting place and cover for fish.

It is also an objective of the present invention to provide a device which can be selectively and quickly deployed through an ice fishing hole.

It is also an objective of the present invention to provide a device that provides a greater surface area of habitat.

Another objective of the present invention is to provide a device that deflects sonar waves providing a virtually invisible habitat.

Another objective of the present invention is to provide a device that is adjustable to different environs and depths of those environs.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

The present invention is an artificial structure 100 for attracting fish. The structure 100 is comprised of central mast 110 with a series of outward extending shafts 115. The structure 100 is composed of material, such as a PVC material, suitable for lowering to the bottom of a lake, stream, pond or other similar body of water. A cable may also be provided for attaching to a dock to suspend the structure 100 or attach weight. Additionally, a docking platform may be utilized to secure multiple structures (100) (not shown) at a single location. The structure 100 forms an artificial habitat or shield for any fish who may be seeking refuge from predators or seeking other fish or food to eat.

Figure 1:
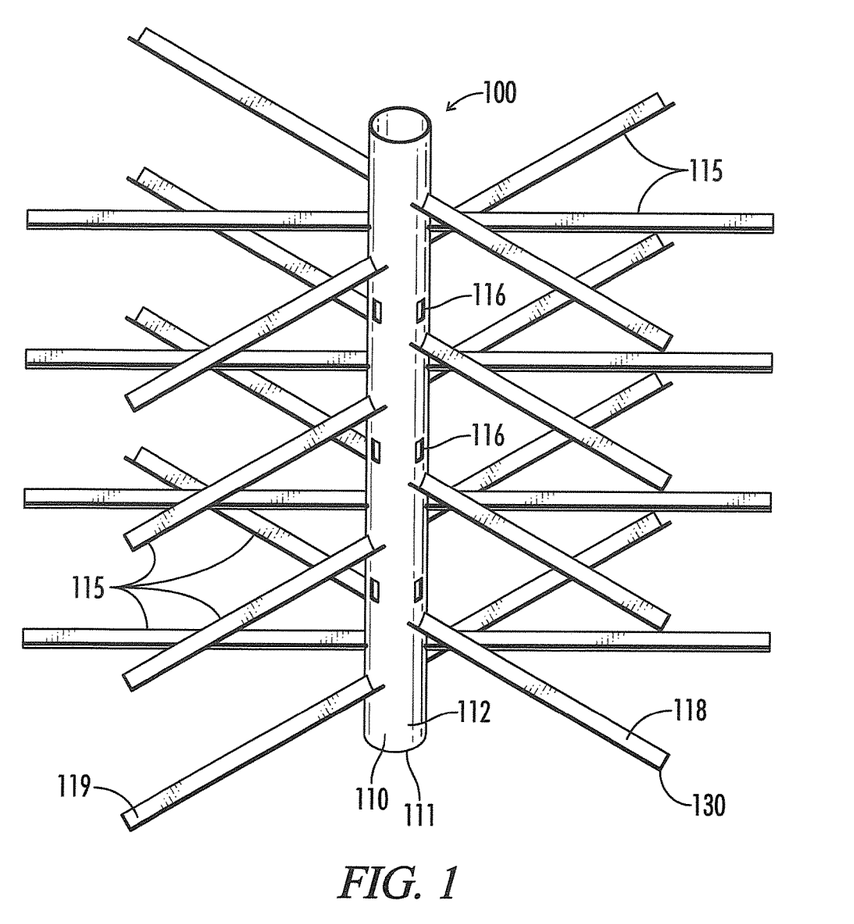
FIG. 1 is a perspective view of the artificial structure for attracting fish.
Figure 2:
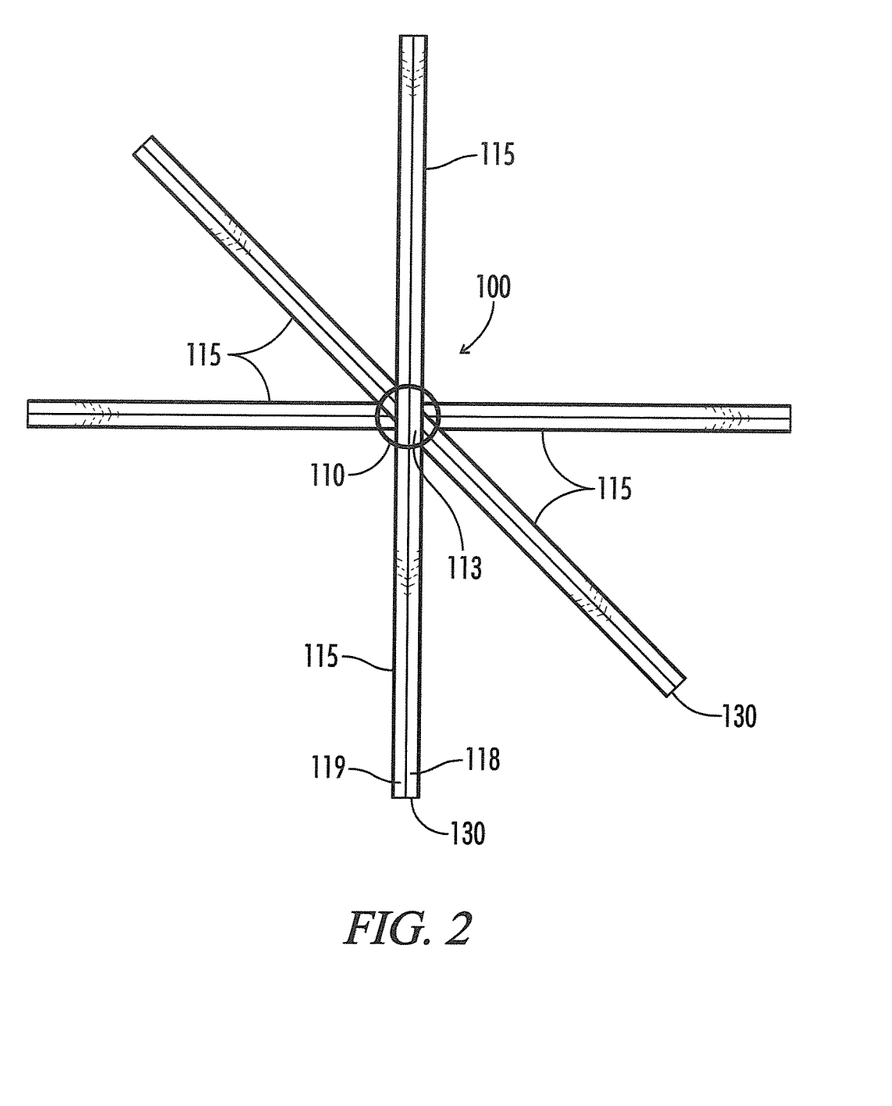
FIG. 2 is a top elevational view thereof.
Figure 3:
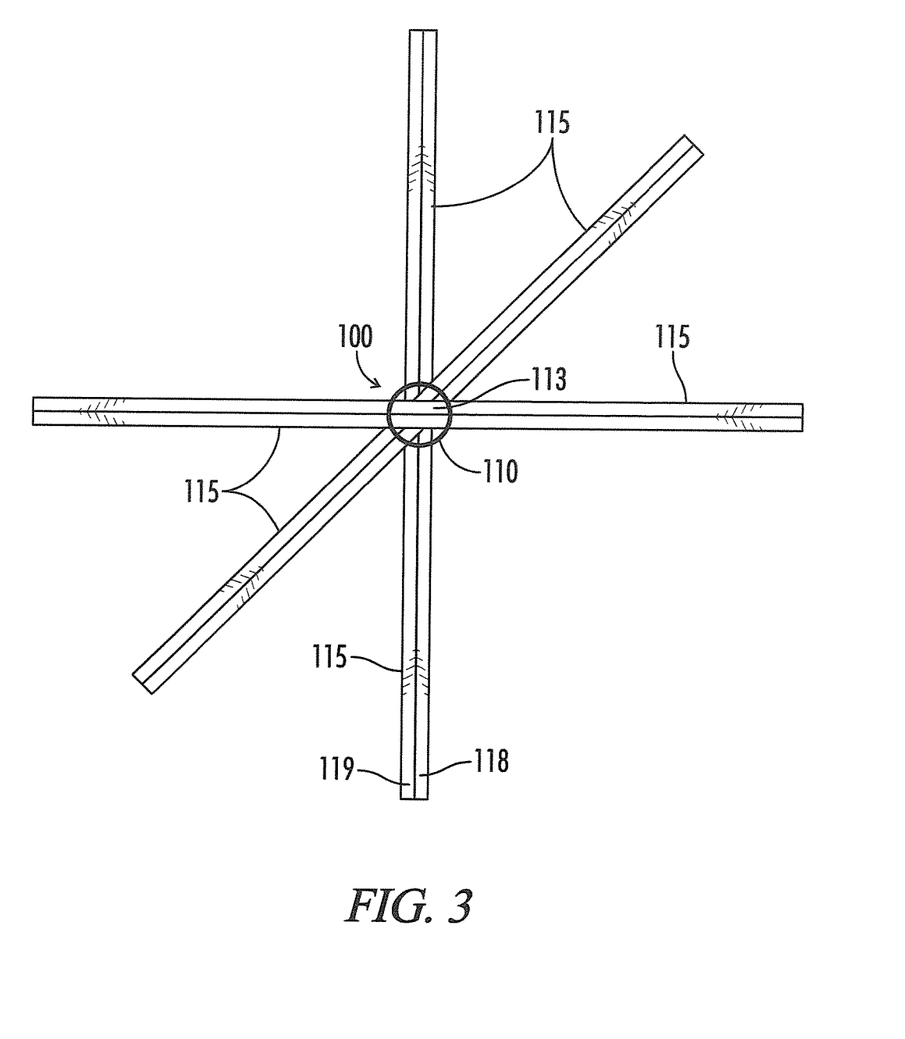
FIG. 3 is a bottom elevational view thereof.

The central mast 110 as shown in the drawings is an elongated, cylindrical tube with open ends, but it is envisioned that the mast 110 can be a variety of shapes. Along the length of the mast 110 are a variety of shaft apertures 114 spaced equidistant around the circumference of the mast 110 and designed and configured so as to receive an extending shaft 115, removably held in the aperture 114 by physical friction. As shown in FIG. 2, the shafts 115 are inserted to extend through the interior 113 of the mast 110. Above each shaft aperture 114 is a second aperture 116 which allows access to the interior 113 of the mast. As shown in FIG. 1, multiple second apertures 116 can be placed around the diameter of the mast 110 creating multiple entrances to the interior 113 of the mast 110. In this manner, fish can access the interior of the mast 110 to hide from larger fish, thus providing an attractive environment.

Figure 5:
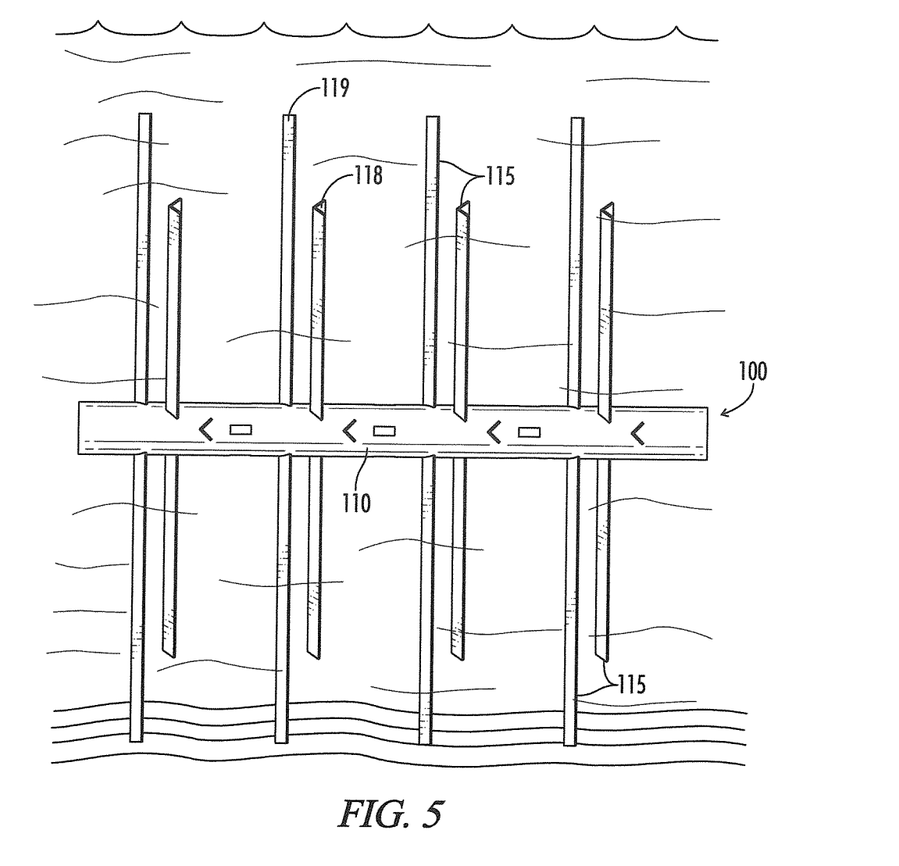
FIG. 5 is a right side environmental view thereof, the left side view being the same.
Figure 6:
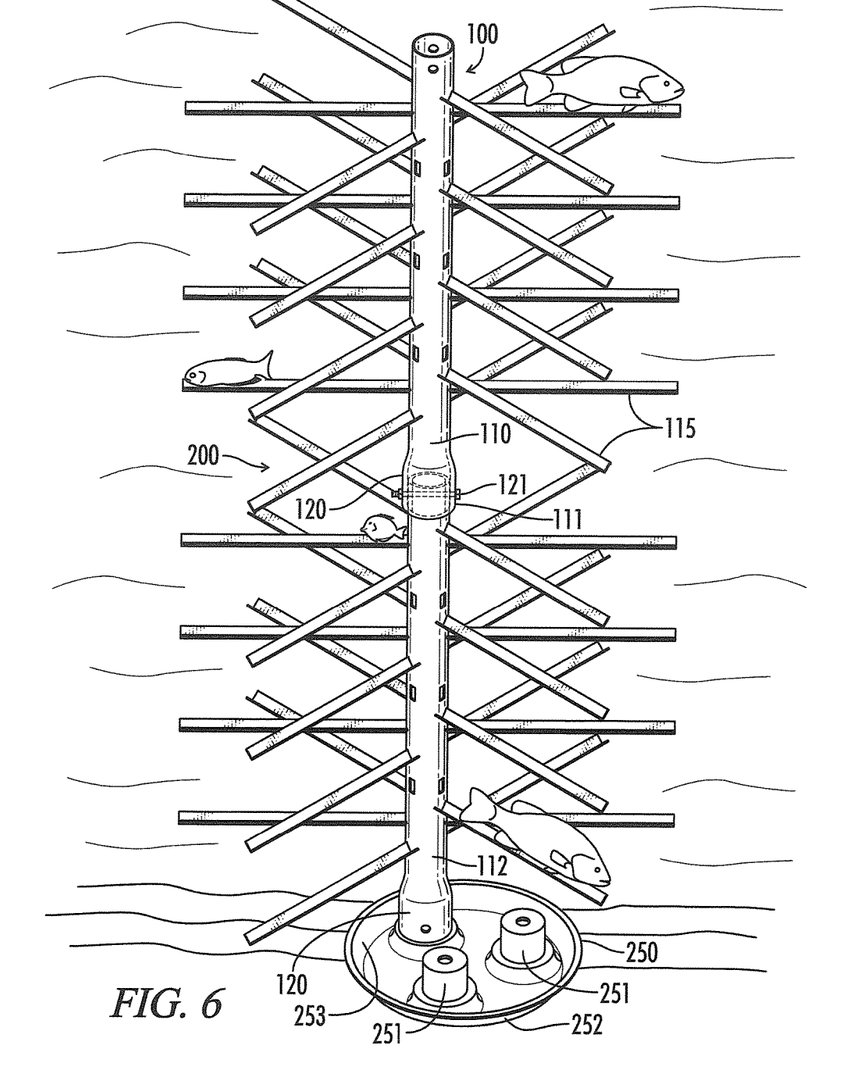
FIG. 6 is an environmental view of a compound structure formed from two structures.

As shown in FIG. 5, the structure 100 can be deployed on its side under the water, or as shown in FIG. 6, in an upright position. When the structure 100 is deployed in an upright position, the base 111 can be secured to a docking port 250. As shown in FIG. 6, the docking port 250 includes multiple piers 251 within a trough 252 having sides 253. When secured, the base 111 fits around a pier 251 and it is envisioned that multiple structures 100 can be secured to a single port 250. The trough can be weighted to the bottom of a body of water through the use of concrete or other similar materials.

Multiple structures 100 can be secured together to form taller or longer structures. The base 111 includes a bell housing 120 attached to the main body 112 to allow for stacking the structure 100 onto another structure 100 to create a compound structure 200. When the base of the first structure is connected to the top of the second structure, the housing 120 fits around the exterior of the top of the second structure. A locking pin 121 running through the housing 120 of the first structure and through the top of the second structure can be utilized to secure the housing 120 connection.

As shown in the drawings, the extending shafts 115 are angled, allowing for fish to rest upon the surface of the shaft. The extending shafts 115 have two flat planks 118, 119 which are joined at a point 130 to form a 90 degree angle. During assembly, the angled shafts 115 are inserted into the mast 110 in pre-cut apertures 114. The angle of the shafts 115 allows for the shaft to support itself through the mast 110 without the use of hardware connecting the shafts 115 to the mast 110. In this manner, the structure 100 is more durable in the aquatic environment without hardware to rust the structure. When installed within the mast 110 when the mast 110 is perpendicular to the ground, the point 130 of angle is downward towards the ground, thus creating a v-shape.

Figure 4:
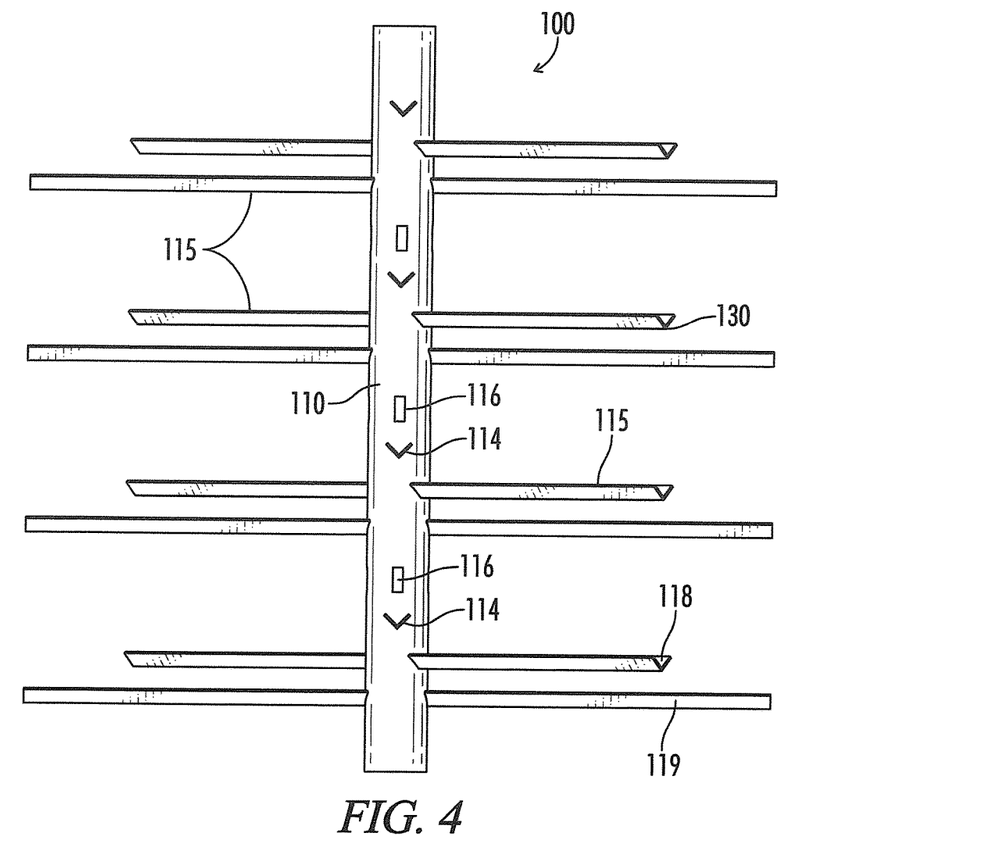
FIG. 4 is a front view thereof, the back view being the same.

The angled shafts 115 provide a greater surface area for the habitat in contrast to rounded shafts. The angles likewise deflect sonar waves from a fish locators used by other fishermen, protecting the location of the habitat. As shown in FIG. 4, the surface of the angled shafts 115 have an applied texture 111 that is mottled in appearance. This mottled texture 111 is composed of a durable paper composite suitable for an underwater environment. After the angled shafts 115 are installed in the water, the surface texture 111 promotes algae to attach and grow on the angled shafts 115, whereas a smooth texture inhibits growth.

The structure 100 can be placed in the water in a horizontal alignment or a vertical alignment. If a horizontal alignment is utilized, weights may be added to the structure 100 to maintain the position of the structure 100 against the current of the water. In the horizontal alignment, the point 130 of the angle of the angled shafts 115 should be oriented towards the shore if the user plans on fishing from a boat casting toward the bank. Conversely, if the user plans on fishing from the shore, the angled shafts 115 should be oriented with the point 130 of the angle toward the interior of the lake. The angled arrangement allows for laminar flow of water over the shafts 115 to create an ideal environment for fish. The flow of the water also allows for fish to rest within the structure 100 on the shafts 115 while exerting minimal energy. In another embodiment, the extending shafts have an essentially horizontal surface with an indentation allowing for fish to rest upon the surface of the shaft. These resting areas provide motivation for the fish to stay within the area for a length of time. Such artificial habitats can also be used to the advantage of fishermen who are looking for the areas where fish tend to congregate.

Once constructed, the structure 100 may be submerged within the bottom of a lake, stream, pond, or other similar body of water thereby providing an artificial habitat for the congregation of fish in areas where natural habitats fail to exist. A cable may be looped around the uppermost extending shaft 115 to provide a cable tether to the structure 100. The extending shafts 115 may be adjusted to vary the length from the mast 110 to accommodate different areas or dock locations.

It is envisioned that the angled shafts 115 alone could be utilized within a water environment through installation in concrete-filled buckets or solid materials suitable for maintaining an upright position for the angled shafts 115.

As shown in FIGS. 7-18, an alternative embodiment of the present invention is an artificial structure 100 for attracting fish that can be deployed through an ice fishing hole which is typically eight inches in diameter. Given the restraints on the diameter of the hole that the structure 100 is deployed through, the diameter of the entire structure 100 in its undeployed state must be less than eight inches.

The structure 100 is comprised of an elongated central mast 110 with a series of pivoting shafts 115 adapted to pivot into a position perpendicular to the central mast in a deployed position underwater. Prior to deployment, the pivoting shafts 115 are positioned parallel to the longitudinal axis of the central mast 110. The structure 100 is composed of material, such as a PVC material, suitable for lowering to the bottom of a lake, stream, pond or other similar body of water. A cable may also be provided for attaching to a dock to suspend the structure 100 or attach weight. The structure 100 forms an artificial habitat or shield for any fish who may be seeking refuge from predators or seeking other fish or food to eat.

Figures 7, 8:
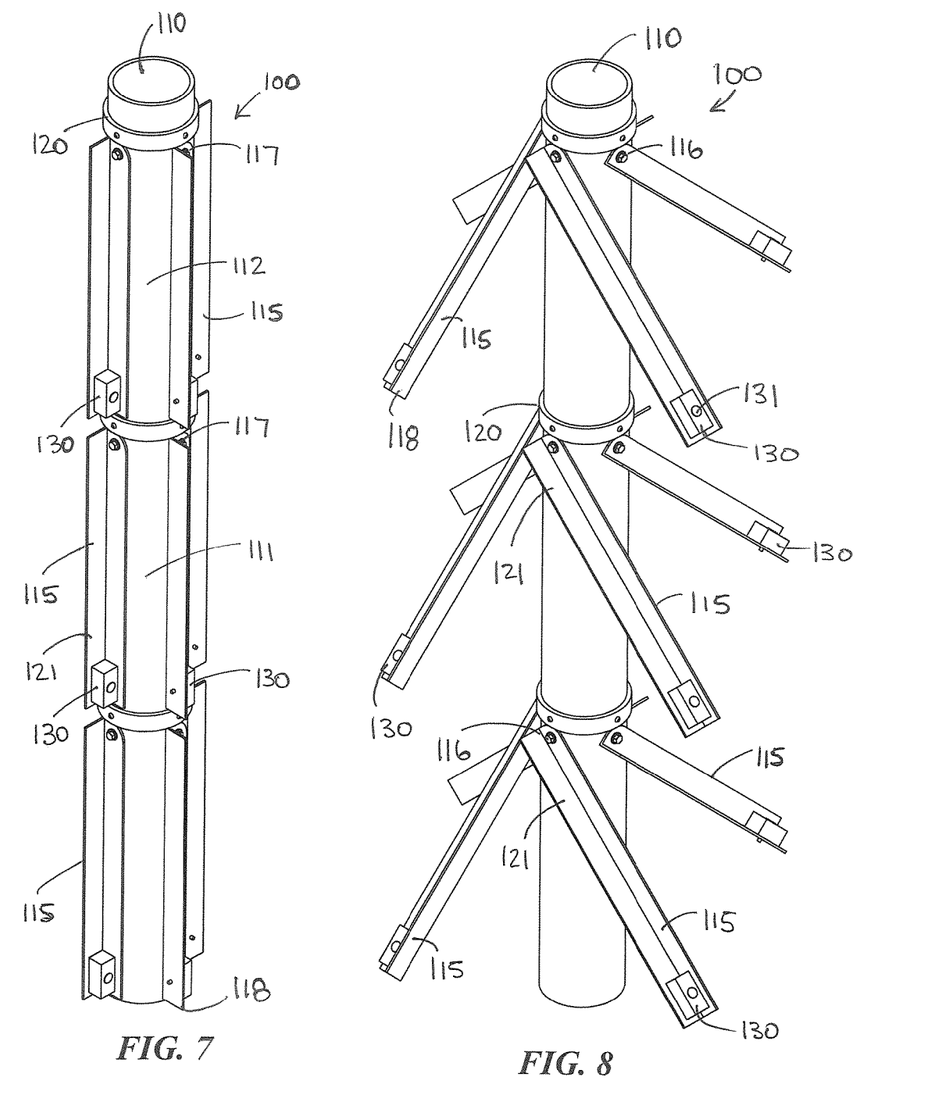
FIG. 7 is a perspective view of an alternative artificial structure for attracting fish in its undeployed state.
FIG. 8 is a perspective view of the artificial structure partially deployed.
Figure 17:
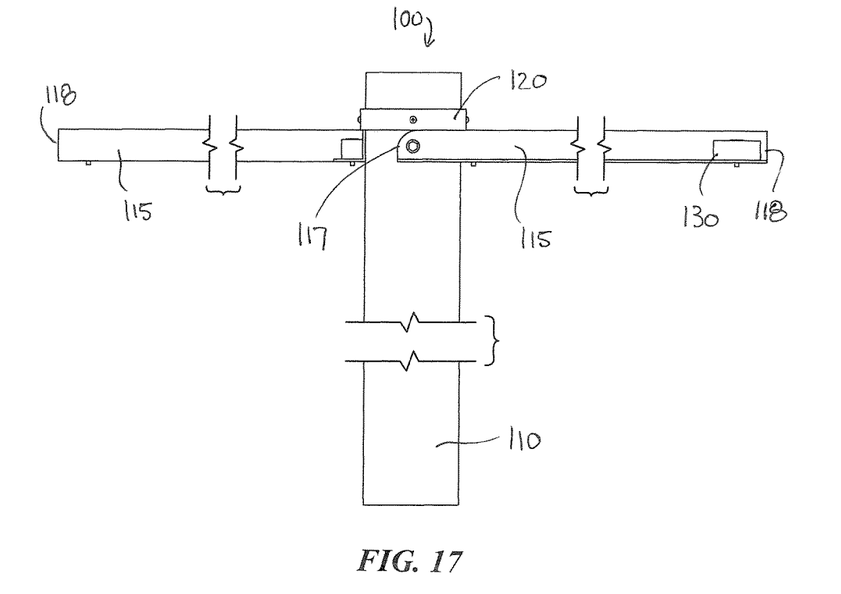
FIG. 17 is a partial front view of the artificial structure fully deployed.
Figure 18:
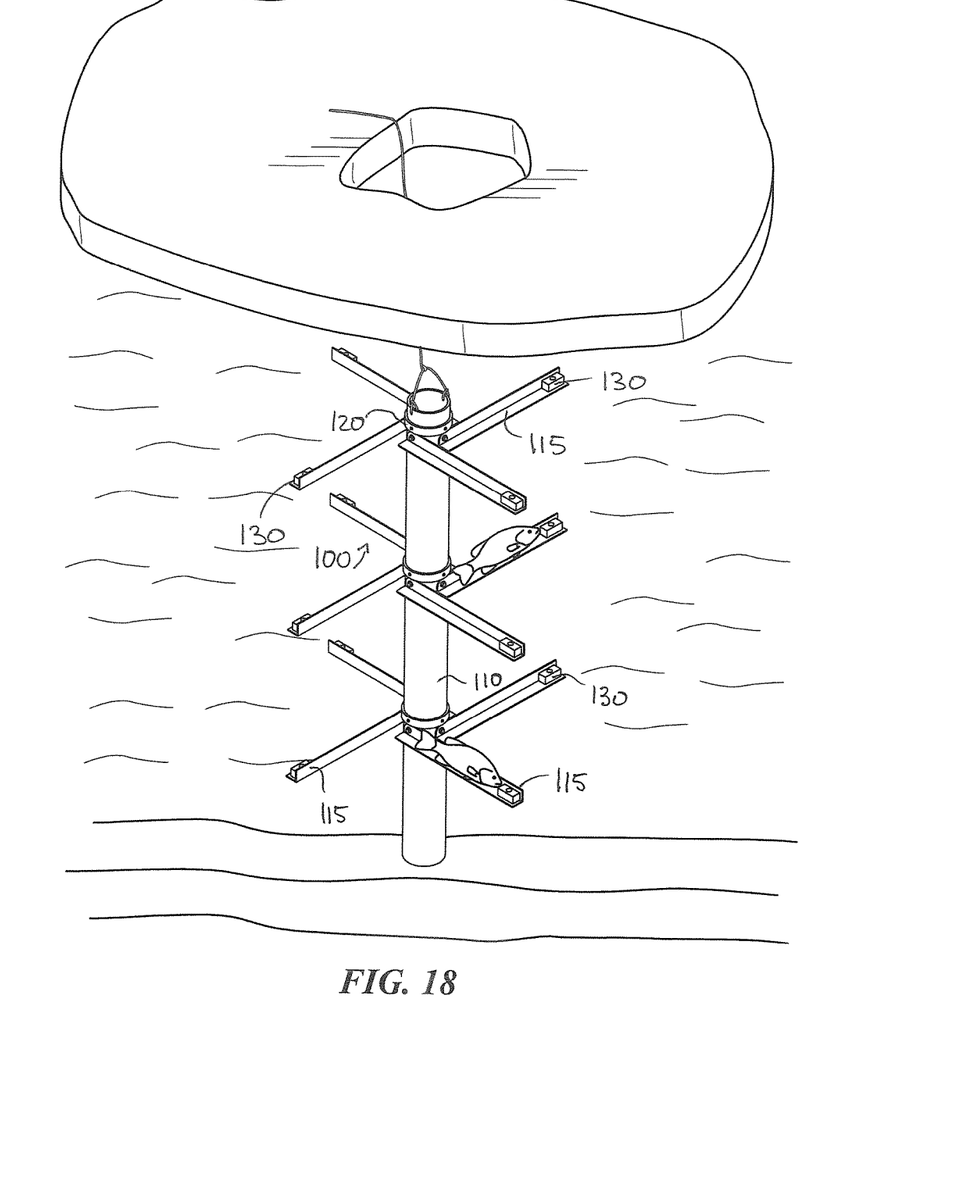
FIG. 18 is an environmental view thereof.

The central mast 110 as shown in the drawings is an elongated, cylindrical tube with open ends, but it is envisioned that the mast 110 can be a variety of shapes. Along the length of the mast 110, pivoting shafts 115 are spaced equidistant around the circumference of the mast 110. Each pivoting shaft 115 is secured by a pivot 116 adapted to allow the shaft 115 to rotate. Each shaft 115 has a top end 117 and a bottom end 118. As shown in FIG. 17, the distance between the top end 117 and the bottom end 118 can differ. As shown in FIG. 7, the distance between the top end 117 and the bottom end 118 is less than the distance between each segment of the central mast 110. However, it is envisioned that if the distance between the ends 117, 118 is longer than a segment of the central mast 110 such that the upper shafts 115 intrude into a lower segment of mast 110, the placement of the pivoting shafts 115 can be shifted in the lower segment 111 from the placement in the upper segment 112. In this manner, the pivoting shafts 115 of both segments 111, 112 will not overlap when undeployed. Above the top end 117 of each shaft 115 when the shafts are in the undeployed position is a restraining collar 120 which extends outward from the mast 110 and provides an upper limit for the shaft 115 when moving into a deployed position.

As shown in the drawings, the pivoting shafts 115 are angled, allowing for fish to rest upon the surface of the shaft. The pivoting shafts 115 have two flat planks 119, 121 extending between the top end 117 and the bottom end 118 and are joined at a point to form a 90 degree angle. When deployed in the water when the mast 110 is perpendicular to the ground, the point of angle is parallel to the ground, thus creating a flat surface. At the end of each pivoting shaft 115, a flotation device 130 is secured by means of a fastener 131 or other suitable attachment known in the art. The flotation device 130 can be composed of any buoyant material capable of rising under water, such as cork, building foam or high density foam. However, cork or corklike substances do not rise quickly and add weight to the device 100, especially after submersion. The preferred substance for the flotation device 130 is a closed cell foam.

The angled shafts 115 provide a greater surface area for the habitat in contrast to rounded shafts. The angles likewise deflect sonar waves from a fish locators used by other fishermen, protecting the location of the habitat.

The angled arrangement allows for laminar flow of water over the shafts 115 to create an ideal environment for fish. The flow of the water also allows for fish to rest within the structure 100 on the shafts 115 while exerting minimal energy. In another embodiment, the extending shafts have an essentially horizontal surface with an indentation allowing for fish to rest upon the surface of the shaft. These resting areas provide motivation for the fish to stay within the area for a length of time. Such artificial habitats can also be used to the advantage of fishermen who are looking for the areas where fish tend to congregate.

Figure 9:
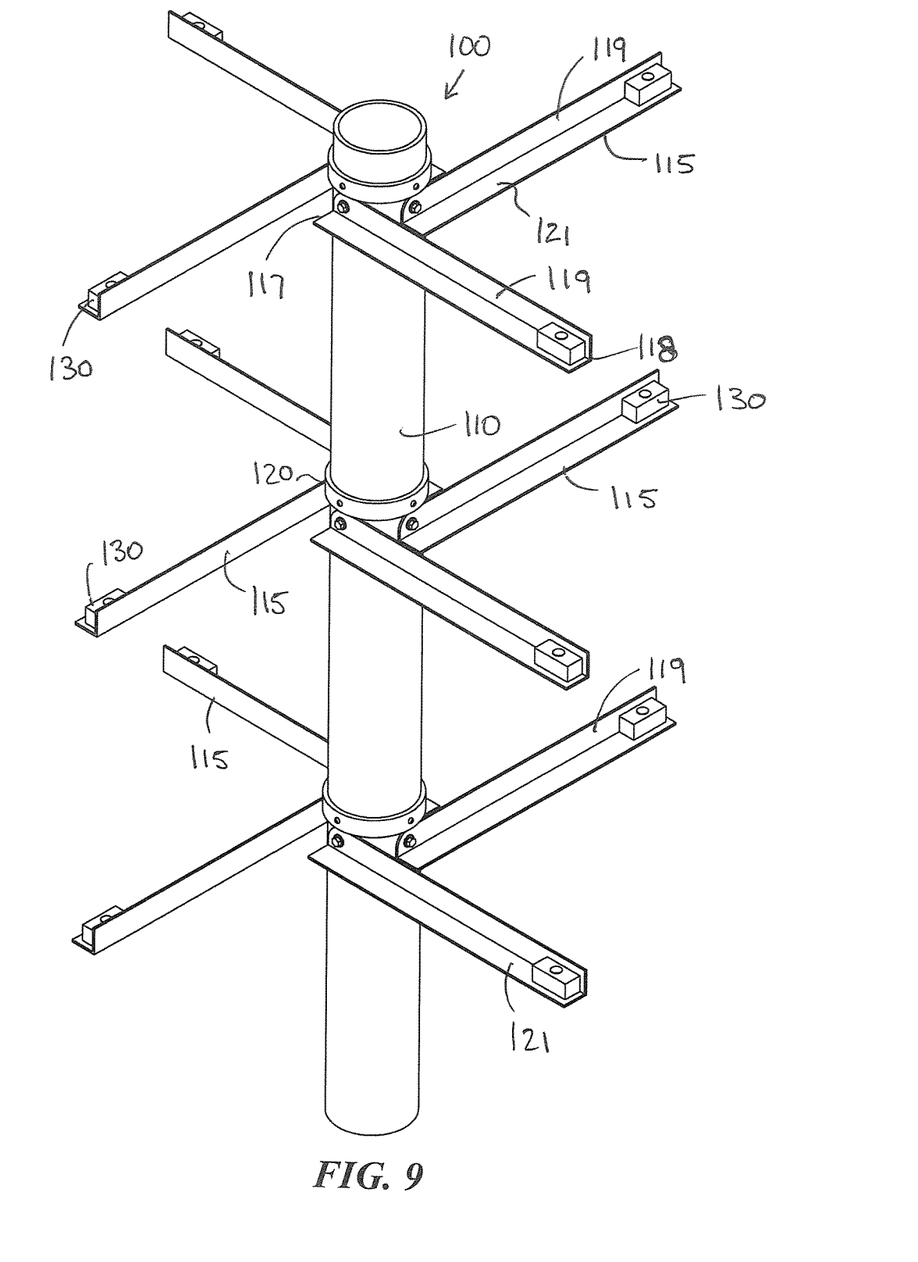
FIG. 9 is a perspective view of the artificial structure fully deployed.
Figure 10:
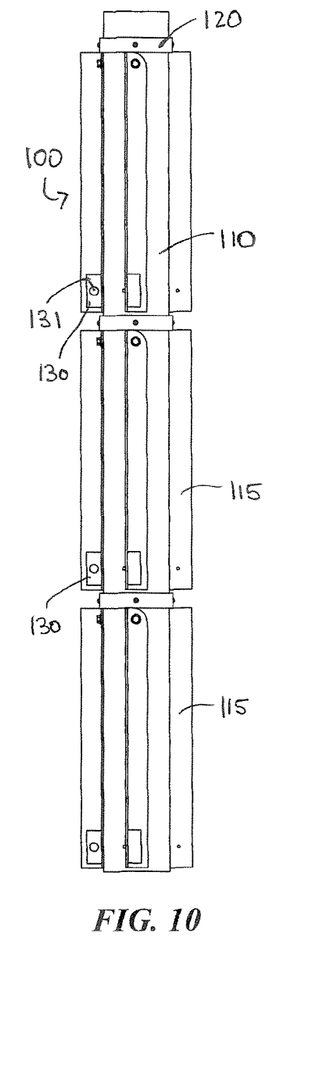
FIG. 10 is a front view of the artificial structure undeployed.
Figure 11:
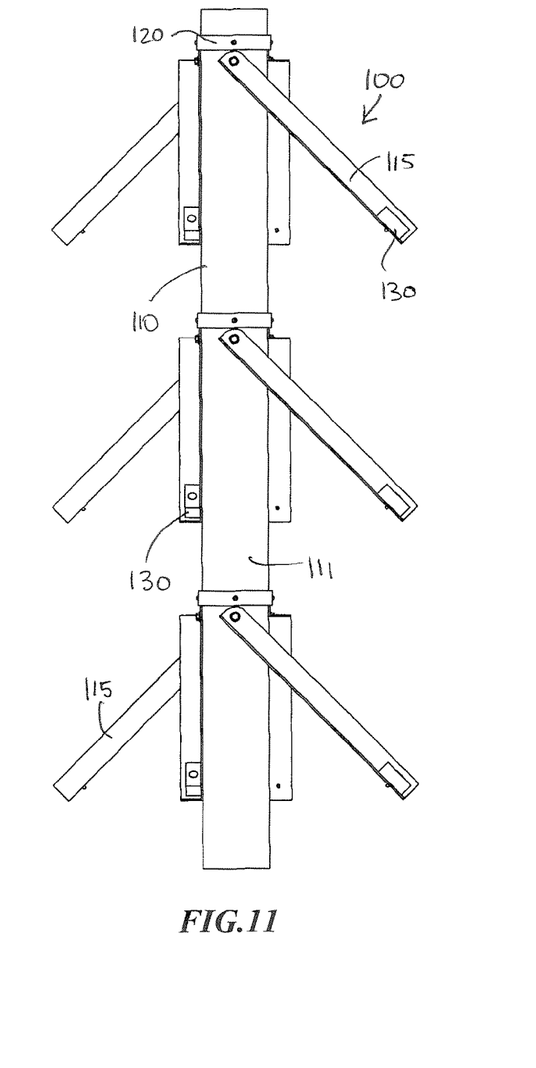
FIG. 11 is a front view of the artificial structure partially deployed.
Figure 12:
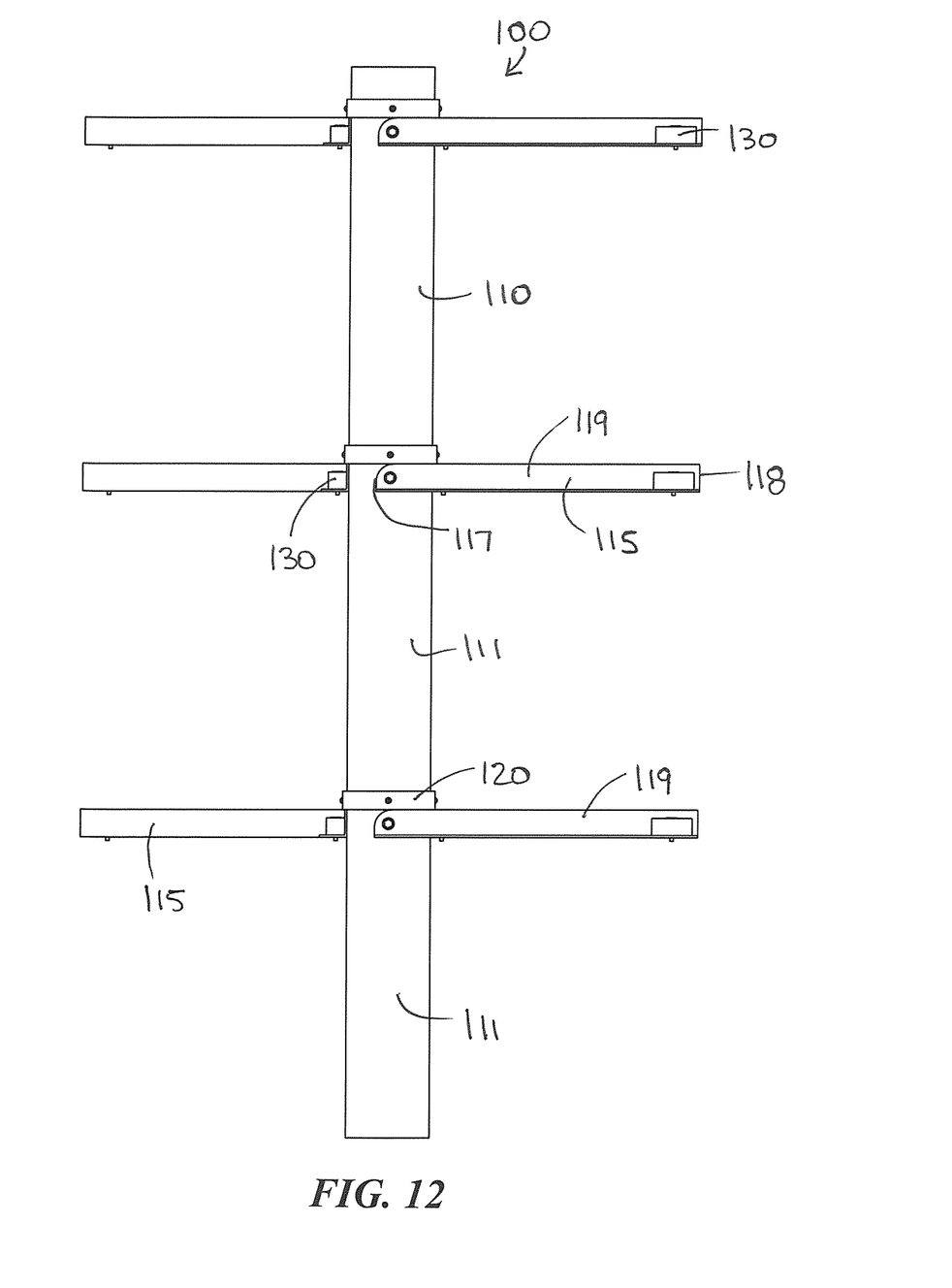
FIG. 12 is a front view of the artificial structure fully deployed.
Figure 13:
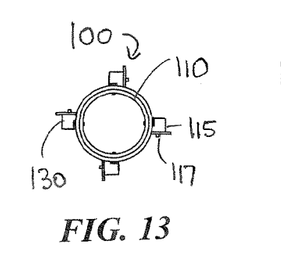
FIG. 13 is a top view of the artificial structure undeployed.
Figures 14, 16:
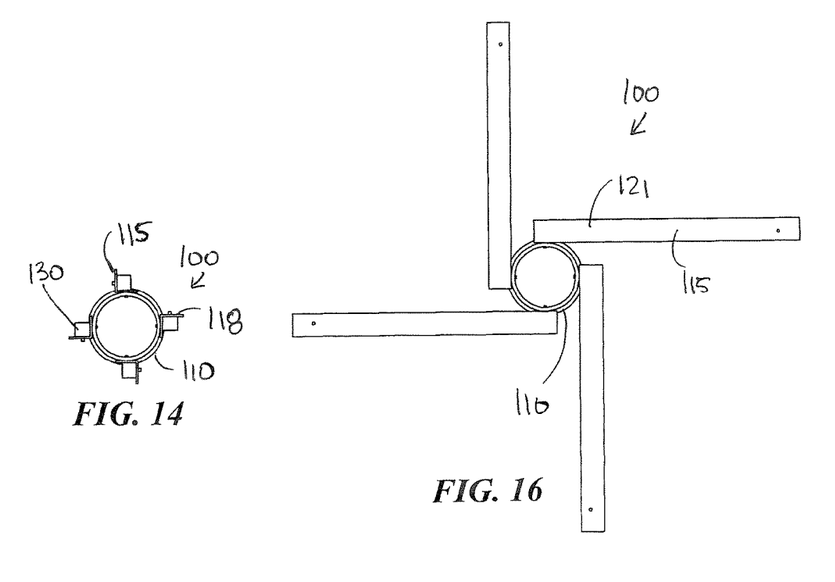
FIG. 14 is a bottom view thereof.
FIG. 16 is a bottom view thereof.
Figure 15:
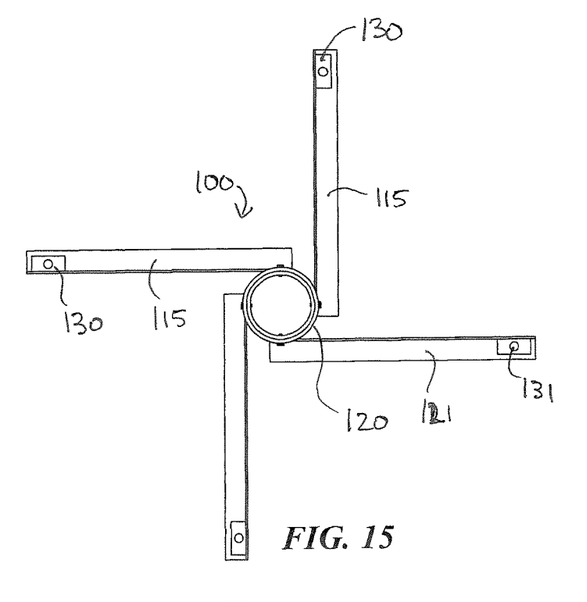
FIG. 15 is a top view of the artificial structure fully deployed.

Once constructed, the structure 100 may be submerged within the bottom of a lake, stream, pond, or other similar body of water thereby providing an artificial habitat for the congregation of fish in areas where natural habitats fail to exist. When the device is deployed, the pivoting arms 115 are in an undeployed position extending parallel along the length of the central mast 110 (as shown in FIGS. 7 and 10). As the flotation device 130 of each pivoting arm is submerged, the buoyancy of the flotation device causes the pivoting arm 115 to pivot to a partially deployed position (as shown in FIGS. 8 and 11) to a fully deployed position (as shown in FIGS. 9 and 12) with the pivoting arms 115 extending perpendicular to the longitudinal axis of the central mast 110. The pivoting arms 115 are restrained from extending further than the fully deployed position by the restraining collar 120, which contacts the edge of the upper flat plank 119 of the pivoting arm 115 and prevents that upper edge from moving further. When the device is removed from water, the pivoting arms 115 are biased downward by gravity and return to the undeployed position.

A cable may be looped around the central mast 110 to provide a cable tether to the structure 100 so that it may be easily removed from the water. The extending shafts 115 may be adjusted to vary the length from the mast 110 to accommodate different areas or dock locations.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. An artificial fishing habitat configured to be submerged in a body of water, said habitat comprising:
    an elongated central mast having a longitudinal axis and at least one restraining collar extending outwardly from the mast;
    a plurality of pivoting shafts pivotally secured to said central mast, each pivoting shaft having two flat planks joined at a point forming a ninety degree angle and a flotation device, said plurality of pivoting shafts configured to move from an undeployed position with said plurality of pivoting shafts extending parallel to said longitudinal axis to a deployed position underwater with said plurality of pivoting shafts extending perpendicular to said longitudinal axis.

2. The artificial fishing habitat of claim 1, said elongated central mast further comprising a housing configured to removably connect a second mast thereby creating a longer habitat.

3. The artificial fishing habitat of claim 1, said flotation device comprising a buoyant material.

4. An artificial fishing habitat configured to be submerged in a body of water, said habitat comprising:
    an elongated central mast having a longitudinal axis and a restraining collar;
    a plurality of pivoting shafts pivotally secured to said central mast, each pivoting shaft having a flotation device, said plurality of pivoting shafts configured to move from an undeployed position with said plurality of pivoting shafts extending parallel to said longitudinal axis to a deployed position underwater with said plurality of pivoting shafts extending perpendicular to said longitudinal axis.

5. The artificial fishing habitat of claim 4, said elongated central mast further comprising a housing configured to removably connect a second mast thereby creating a longer habitat.

6. The artificial fishing habitat of claim 4, said flotation device comprising a buoyant material.

7. The artificial fishing habitat of claim 4, said pivoting shafts having two planks forming a ninety degree angle.

* * * * *